US011772822B2

(12) United States Patent
Bonnefoy

(10) Patent No.: US 11,772,822 B2
(45) Date of Patent: Oct. 3, 2023

(54) OBJECT LIFTING SYSTEM AND METHOD

(71) Applicant: The Boeing Company, Chicago, IL (US)

(72) Inventor: Pierig Bonnefoy, Chuzelles (FR)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/570,217

(22) Filed: Jan. 6, 2022

(65) Prior Publication Data

US 2022/0234761 A1 Jul. 28, 2022

Related U.S. Application Data

(60) Provisional application No. 63/141,946, filed on Jan. 26, 2021.

(51) Int. Cl.
| | |
|---|---|
| *B64F 5/50* | (2017.01) |
| *B64F 5/10* | (2017.01) |
| *B66F 7/20* | (2006.01) |
| *B64C 1/06* | (2006.01) |

(52) U.S. Cl.
CPC .............. *B64F 5/50* (2017.01); *B64F 5/10* (2017.01); *B66F 7/20* (2013.01); *B64C 1/061* (2013.01)

(58) Field of Classification Search
CPC ...... B64F 5/50; B64F 5/10; B66F 7/20; B64C 1/061; B64C 1/068; B23P 2700/01; B23P 19/10; B21J 15/42; B21J 15/142
See application file for complete search history.

(56) References Cited

U.S. PATENT DOCUMENTS

| | | | |
|---|---|---|---|
| 2009/0234488 A1* | 9/2009 | Kilibarda | B62D 65/00 |
| | | | 901/50 |
| 2019/0144134 A1 | 5/2019 | Kasahara et al. | |
| 2022/0153434 A1 | 5/2022 | Smith et al. | |

FOREIGN PATENT DOCUMENTS

| | | |
|---|---|---|
| CN | 107283159 | 10/2017 |
| DE | 19745145 | 4/1998 |
| EP | 3378789 | 9/2018 |
| FR | 2788743 | 7/2000 |

OTHER PUBLICATIONS

Extended European Search Report for EP Application No. 22152679.1 dated Jun. 8, 2022.

* cited by examiner

*Primary Examiner* — Lee A Holly
(74) *Attorney, Agent, or Firm* — Kunzler Bean & Adamson

(57) ABSTRACT

Disclosed herein is a system for lifting an object. The system comprises a first floor, a second floor, and an object rack supported on the second floor. The system further comprises an object advance apparatus coupled with the object rack. The object advance apparatus is configured to advance one object from the plurality of objects from an advancing position to a lifting position. The system additionally comprises a lifting cylinder that is configured to extend from a retracted position below the lifting position to an extended position above the first floor, such that the one object in the lifting position is removed from the object rack and lifted adjacent to the assembling body. The system also comprises a floor flap configured to open and close in synchronization with the extension and retraction of the lifting cylinder.

20 Claims, 7 Drawing Sheets

OBJECT LIFTING SYSTEM AND METHOD

FIELD

This disclosure relates generally to lifting an object, and more particularly to a system and method for lifting an object from a sub-floor to an upper-floor.

BACKGROUND

The assembly of large structures, such as airplanes, is typically performed on a factory floor where parts are moved into installation positions to be installed to and partially form the large structure. In the case of an airplane, parts to be installed on the airplane, such as sub-assemblies of a fuselage, can be assembled together to form the fuselage in an assembly line.

A moving assembly line, such as a pulse line, can be utilized. In a pulse line, parts to be installed are positioned sequentially in a straight or U-shaped line on the factory floor. The parts stay at those positions while the large structure (e.g., an aircraft fuselage) is moved through the pulse line. The large structure will remain in one location along the pulse line until all the parts at that location are installed and other planned work is completed, then the large structure is moved (i.e. pulsed) to the next location. Existing solutions primarily use manual processes for locating, moving, and positioning of parts, which leads to long installation times and is labor intensive. Accordingly, the time and labor inefficiencies of manual processes can slowdown the assembly of large structures in the assembly line, which can result in rate requirements, such as for an aircraft fuselage assembly line, to be missed.

SUMMARY

The subject matter of the present application has been developed in response to the present state of the art, and in particular, in response to shortcomings of conventional installation and assembly processes and systems. Accordingly, the subject matter of the present application provides a system and method for lifting an object that overcome at least some of the above-discussed shortcomings of conventional processes and systems.

Disclosed herein is a system for lifting an object. The system comprises a first floor and a second floor. The first floor is directly above the second floor and securing an assembling body and the second floor. The system also comprises an object rack supported on the second floor. The object rack is configured to support a plurality of objects. The plurality of objects configured to be attached to the assembling body. The system further comprises an object advance apparatus coupled with the object rack. The object advance apparatus is configured to advance one object from the plurality of objects from an advancing position to a lifting position. The system additionally comprises a lifting cylinder supported by the second floor and positioned in line with the lifting position on the object rack. The lifting cylinder is configured to extend from a retracted position below the lifting position on the object rack to an extended position above the first floor, such that as the lifting cylinder is extended from the retracted position the one object in the lifting position is removed from the object rack and lifted adjacent to the assembling body. The system also comprises a floor flap in the first floor directly above the lifting cylinder. The floor flap is configured to open and close in synchronization with the extension and retraction of the lifting cylinder such that the floor flap is opened as the lifting cylinder is extended toward the first floor and remains opened while the lifting cylinder is in the extended position and is closed when the lifting cylinder is retracted below the first floor toward the retracted position and remains closed while the lifting cylinder is in the retracted position. The preceding subject matter of this paragraph characterizes example 1 of the present disclosure.

The system further comprises a conveyor system. The assembling body is secured to the conveyor system on the first floor, and the assembling body is moved along the conveyor system at a specified pulse rate. The preceding subject matter of this paragraph characterizes example 2 of the present disclosure, wherein example 2 also includes the subject matter according to example 1, above.

The assembling body is an aircraft fuselage. The preceding subject matter of this paragraph characterizes example 3 of the present disclosure, wherein example 3 also includes the subject matter according to any one of examples 1 or 2, above.

The plurality of objects is a plurality of frame sections to be attached to the aircraft fuselage. The preceding subject matter of this paragraph characterizes example 4 of the present disclosure, wherein example 4 also includes the subject matter according to example 3, above.

The system further comprises a user device in electrical communication with the lifting cylinder. The user device is selectively operable by an operator to extend and retract the lifting cylinder. The preceding subject matter of this paragraph characterizes example 5 of the present disclosure, wherein example 5 also includes the subject matter according to any one of examples 1-4, above.

The system further comprises a plurality of object racks. Each object rack of the plurality of object racks is configured to support a plurality of objects. The system also comprises an object advance apparatus coupled with each object rack of the plurality of object racks. Each one of the object advance apparatus is configured to advance one object from the plurality of objects of a corresponding one of the plurality of object racks from an advancing position to a lifting position. The system additionally comprises a plurality of lifting cylinders on the second floor. A corresponding one of the plurality of lifting cylinders is positioned in line with the lifting position on each object rack of the plurality of object racks. Each one of the plurality of lifting cylinders is configured to extend from the retracted position below the lifting position on the corresponding object rack to the extended position above the first floor, such that as the lifting cylinder is extended from the retracted position the one object in the lifting position is removed from the corresponding object rack and lifted adjacent to the assembling body secured to the first floor. The system further comprises a plurality of floor flaps in the first floor each directly above a corresponding one of the lifting cylinders of the plurality of lifting cylinders. Each floor flap configured to open and close in synchronization with the extension and retraction of the corresponding lifting cylinder, such that the floor flap is opened as the corresponding lifting cylinder is extended toward the first floor and remains opened while the corresponding lifting cylinder is in the extended position and is closed when the corresponding lifting cylinder is retracted below the first floor toward the retracted position and remains closed while the corresponding lifting cylinder is in the retracted position. The preceding subject matter of this paragraph characterizes example 6 of the present disclosure, wherein example 6 also includes the subject matter according to any one of examples 1-5, above.

The plurality of lifting cylinders is configured to automatically extend from the retracted position to the extended position and retract from the extended position to the retracted position at a specific rate. The plurality of cylinders is configured to extend and retract simultaneously. The object advance apparatus coupled with each object rack is configured to advance one object from the plurality of objects from the advancing position to the lifting position when the lifting cylinder is in the retracted position. The preceding subject matter of this paragraph characterizes example 7 of the present disclosure, wherein example 7 also includes the subject matter according to example 6, above.

The plurality of lifting cylinders is configured to automatically extend from the retracted position to the extended position and retract from the extended position at a specific rate. Each lifting cylinder of the plurality of lifting cylinders is configured to extend and retract consecutively with the other lifting cylinders of the plurality of lifting cylinders. The object advance apparatus connected to each object rack is configured to advance one object from the plurality of objects from the advancing position to the lifting position when the lifting cylinder is in the retracted position. The preceding subject matter of this paragraph characterizes example 8 of the present disclosure, wherein example 8 also includes the subject matter according to any one of examples 6-7, above.

Each lifting cylinder of the plurality of lifting cylinders is in electrical communication with a user device. The user device is selectively operable by an operator to extend from the retracted position to the extended position and retract from the extended position to the retracted position at least one lifting cylinder of the plurality. The preceding subject matter of this paragraph characterizes example 9 of the present disclosure, wherein example 9 also includes the subject matter according to any one of examples 6-8, above.

The object rack has a plurality of notches. Each object of the plurality of objects is supported on the object rack in engagement with a corresponding notch of the plurality of notches. The preceding subject matter of this paragraph characterizes example 10 of the present disclosure, wherein example 10 also includes the subject matter according to any one of examples 1-9, above.

Further disclosed herein is a system for lifting an object. The system comprises a first floor and a second floor. The first floor is directly above the second floor and securing an aircraft fuselage and the second floor supporting a plurality of frame racks. Each frame rack of the plurality is configured to support a plurality of frames. The plurality of frames is configured to be attached to the aircraft fuselage. The system also comprises a frame advance apparatus in connection with each frame rack of the plurality. The frame advance apparatus configured to advance one frame from the plurality of frames from an advancing position on each frame rack to a lifting position on each frame rack. The system further comprises a plurality of lifting cylinders supported by the second floor. One lifting cylinder of the plurality positioned is in line with the lifting position on a corresponding frame rack. Each lifting cylinder is configured to extend from a retracted position below the lifting position on the corresponding frame rack to an extended position above the first floor, such that as each lifting cylinder is extended from the retracted position the one frame in the lifting position is removed from the corresponding frame rack and lifted adjacent to the aircraft fuselage. The system additionally comprises a plurality of floor flaps. Each one of the plurality of floor flaps in the first floor is directly above a corresponding one of the plurality of lifting cylinders, the floor flaps are configured to open and close in synchronization with the extension and retraction of the corresponding lifting cylinder, such that the floor flaps are opened as the corresponding lifting cylinder is extended toward the first floor and remains opened while the lifting cylinder is in the extended position and are closed when the corresponding lifting cylinder is retracted below the first floor toward the retracted position and remains closed while in the corresponding lifting cylinder is in the retracted position. The preceding subject matter of this paragraph characterizes example 11 of the present disclosure.

Additionally disclosed herein is a method that comprises placing a plurality of objects on an object rack where the object rack is supported by a second floor, the second floor being directly below a first floor. The method also comprises advancing the plurality of objects with an object advance apparatus coupled with the object rack. One object of the plurality of objects advances from an advancing position to a lifting position. The method further comprises lifting the one object in the lifting position from the object rack with a lifting cylinder where the lifting cylinder is on the second floor and positioned in line with the lifting position on the object rack. The lifting cylinder extends from a retracted position below the lifting position on the object rack to an extended position above the first floor. The method additionally comprises opening a floor flap in the first floor directly above the lifting cylinder. The floor flap is in synchronization with the lifting cylinder, such that the floor flap opens as the lifting cylinder is extended toward the first floor and remains open while the lifting cylinder is in the extended position. The preceding subject matter of this paragraph characterizes example 12 of the present disclosure.

The method further comprises removing the one object from the lifting cylinder. The method also comprises retracting the lifting cylinder from the extended position to the retracted position. The method additionally comprises closing the floor flap as the lifting cylinder is retracted below the first floor towards the retracted position and remaining closed while the lifting cylinder is in the retracted position. The preceding subject matter of this paragraph characterizes example 13 of the present disclosure, wherein example 13 also includes the subject matter according to example 12, above.

The method further comprises advancing remaining objects of the plurality of objects. One object of the plurality of objects advances from the advancing position on the object rack to the lifting position on the object rack. The method also comprises lifting the one object in the lifting position from the object rack with the lifting cylinder. The lifting cylinder extends from the retracted position below the lifting position on the object rack to the extended position above the first floor. The method additionally comprises opening the floor flap in the first floor directly above the lifting cylinder. The floor flap is in synchronization with the lifting cylinder, such that the floor flap opens as the lifting cylinder is extended toward the first floor. The preceding subject matter of this paragraph characterizes example 14 of the present disclosure, wherein example 14 also includes the subject matter according to example 13, above.

The method further comprises removing the one object from the lifting cylinder by an operator on the first floor. The method also comprises installing the one object on an assembling body by the operator, the assembling body is secured to the first floor. The preceding subject matter of this paragraph characterizes example 15 of the present disclosure, wherein example 15 also includes the subject matter according to any one of examples 12-14, above.

The one object comprises a frame device. The assembly body comprises an aircraft fuselage. Installing the one object on the assembly body comprises installing the frame device to the aircraft fuselage. The preceding subject matter of this paragraph characterizes example 16 of the present disclosure, wherein example 16 also includes the subject matter according to example 15, above.

Placing a plurality of objects on an object rack comprises placing a plurality of objects on a plurality of object racks, such that each object rack of the plurality supports a plurality of objects. Advancing the plurality of objects with the object advance apparatus comprises advancing the plurality of objects on each object rack with an object advance apparatus coupled with each object rack. Lifting the one object in the lifting position from the object rack with a lifting cylinder comprises lifting the one object in the lifting position from at least one object rack of the plurality of object racks. Opening a floor flap in the first floor comprises opening a floor flap of a plurality of floor flaps in the first floor that is directly over the lifting cylinder that is extending to the extended position. The preceding subject matter of this paragraph characterizes example 17 of the present disclosure, wherein example 17 also includes the subject matter according to any one of examples 12-16, above.

Lifting the one object in the lifting position comprises lifting the one object in each lifting cylinder of the plurality of lifting cylinders simultaneously. The preceding subject matter of this paragraph characterizes example 18 of the present disclosure, wherein example 18 also includes the subject matter according to example 17, above.

Lifting the one object in the lifting position comprises lifting the one object in each lifting cylinder of the plurality of lifting cylinders consecutively. The preceding subject matter of this paragraph characterizes example 19 of the present disclosure, wherein example 19 also includes the subject matter according to any one of examples 17-18, above.

The method further comprises operating a user device in electrical communication with the plurality of lifting cylinders to lift at least one lifting cylinder of the plurality of lifting cylinders. The user device is selectively operable by an operator to extend and retract the lifting cylinders. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

In some examples, the present disclosure provides systems and methods that are configured to lift an object adjacent to an assembling body for later installation of the object to the assembling body. Generally, the process of bringing an object adjacent to an assembling body for installing is a time-consuming, labor-intensive and manually-driven process. The systems and methods of the present invention can be used to make the process more automated and efficient by automatically lifting the object to be installed from a sub-floor adjacent to the assembling body. Accordingly, the systems and methods can be used to help to ensure an object is lifted adjacent to the area where the object is to be installed in a timely and labor efficient manner. In other words, the systems and methods are used for lifting and delivering objects to a point of use, and can be used within an assembly line. In one implementation, the lifting of objects on a lifting cylinder is synchronized with an object advancing system and floor flaps on a pulsed assembly line.

Figure 1:
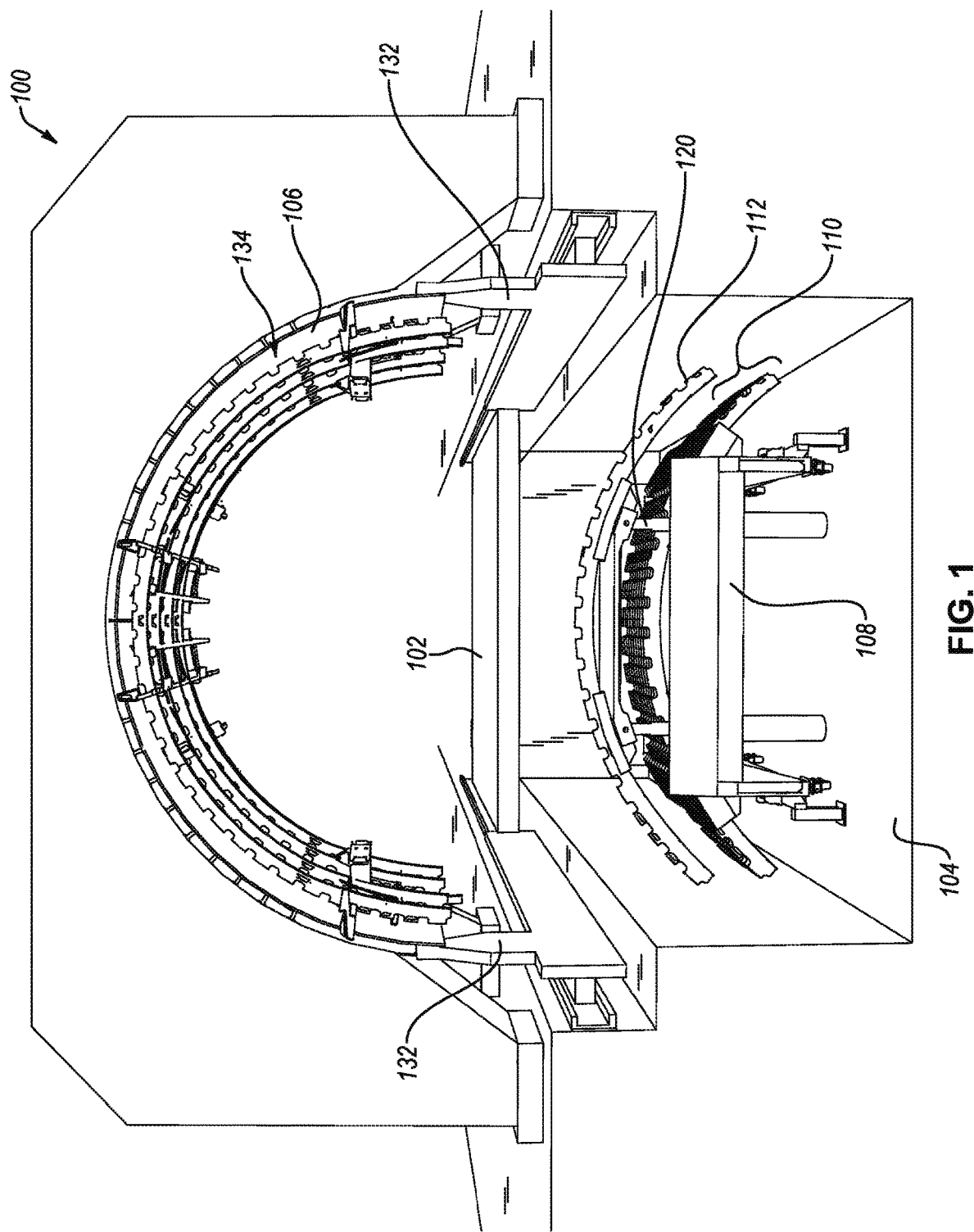
FIG. 1 is a schematic perspective view of a system for lifting an object, according to one or more examples of the present disclosure.

Referring to FIG. 1, and according to some examples, a system 100 for lifting an object is shown. The system 100 includes a first floor 102 and a second floor 104. The first floor 102 is directly above the second floor 104. In one example, the first floor 102 is at ground level and the second floor 104 is below ground level. In other examples, the second floor 104 is at ground level and the first floor 102 is above ground level. It is not necessary for the first floor 102 and the second floor 104 to have the same dimensions (i.e. width or length). Rather, it is necessary for the second floor 104 to be directly beneath the first floor 102 so that objects can be lifted vertically from an original location supported by the second floor 104 to a secondary location directly vertically in-line with the original location above the first floor 102.

An assembling body 106 is secured to the first floor 102. In one example, the assembling body 106 is secured directly to the first floor 102. In other words, the assembling body 106 is fixed to the first floor 102 and does not move relative to the first floor 102, while the system 100 facilitates assembly of an object or objects to the assembling body 106. Such direct securing could be through bolting or otherwise fastening the assembling body 106 to the first floor 102. In other examples, the assembling body 106 is secured indirectly to the first floor 102, and may be fixed or movable along the first floor 102. For example, the assembling body 106 may move along the first floor 102 by being secured to a conveyor system 132 that is secured to the first floor 102. The conveyor system 132 may be used to move the assembling body 106 through an assembly line while the assembling body 106 is being assembled. In one example, the assembly line is a pulse line, where the assembling body 106 remains at a location shown in FIG. 1 during the lifting and installation of objects and other necessary work and then is pulsed to the next location along the assembly line. The lifting and installation of objects using the system 100 improves the efficiency over more manual processes.

The assembling body 106 is a large structure that is in the process of being assembled (e.g., not yet in a finalized state). The assembling body 106 may be any shape or size. In one example, only an interior surface of the assembling body 106 is accessible for an object to be installed to the assembling body 106. One such example is an aircraft fuselage 134, where objects are lifting into the interior of a half barrel of the aircraft fuselage 134. In other examples, both an exterior surface and an interior surface of the assembling body 106 are accessible and an object can be installed to either surface of the assembling body 106.

The system 100 further includes an object rack 108 that is supported on the second floor 104. The object rack 108 may be fixed to the second floor 104 or may be moveable about the second floor 104. The object rack supports a plurality of objects 110. In one example, the plurality of objects 110 are identical objects having the same size, shape, weight etc. In another example, the plurality of objects 110 may vary in size, shape, weight, etc. as long as the differing objects are capable of being lifted by a lifting cylinder as described below.

The system 100 further includes a lifting cylinder 120 that is also supported on the second floor 104. In one example, the lifting cylinder 120 is separate from the object rack 108. In another example, the lifting cylinder is attached to or integrally formed to the object rack 108. The lifting cylinder 120 is positioned in line with a lifting position 118 (see, e.g., FIG. 3) on the object rack 108. Accordingly, the lifting cylinder 120 is configured to extend and retract vertically in line with the lifting position 118. As shown in FIG. 1, an object 112 of the plurality of objects 110 is being lifted from the object rack 108 by the lifting cylinder 120.

Figure 2:
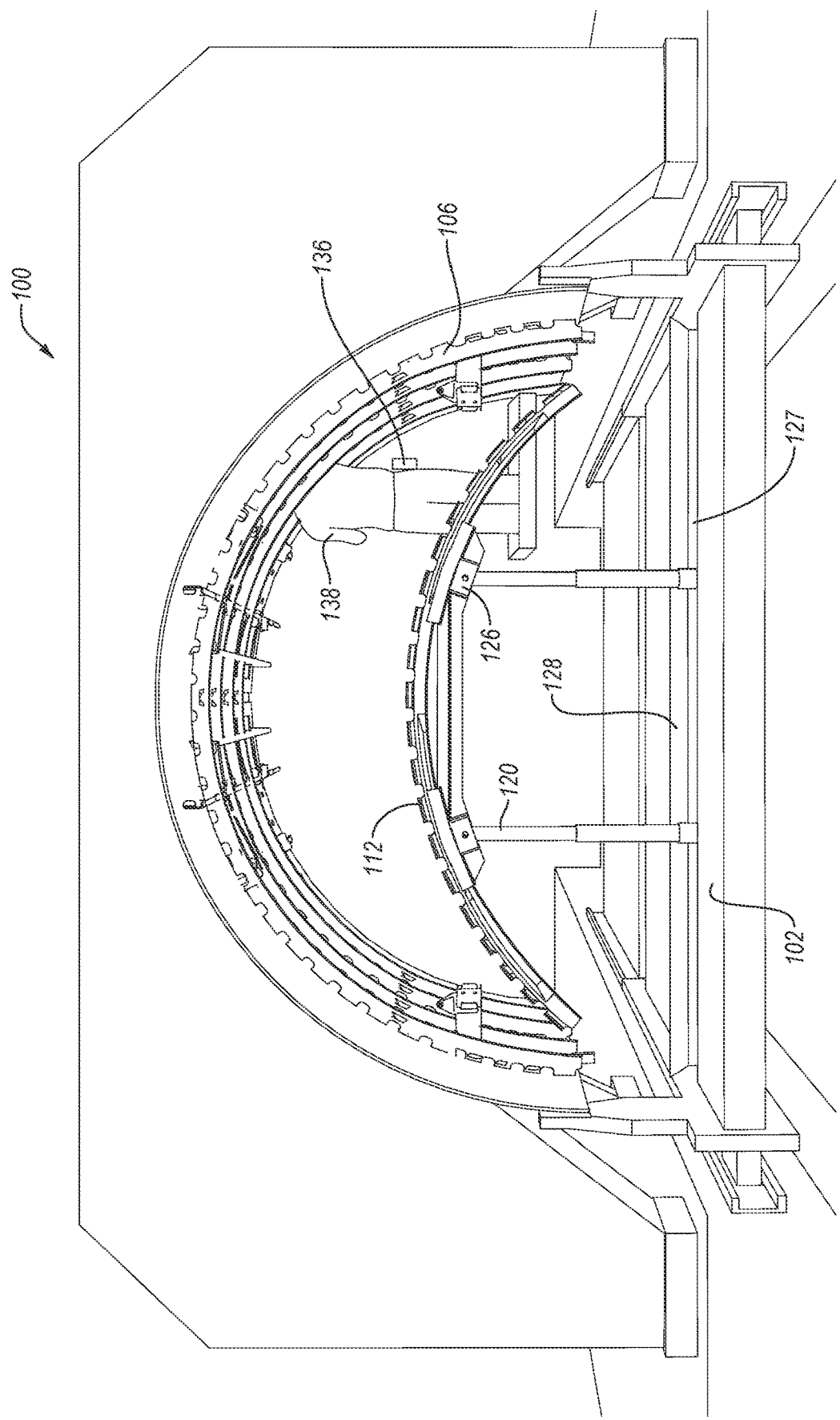
FIG. 2 is a schematic perspective view of a lifting cylinder in an extended position, according to one or more examples of the present disclosure.

Referring to FIG. 2, the lifting cylinder 120 is configured to move vertically from the second floor 104 to an extended position 126 above the first floor 102. The lifting cylinder 120 lifts the object 112 adjacent to the assembling body 106. In one example, the extended position 126 is at a location that is accessible and ergonomic for an operator 138 to pick up the object 112.

As shown in FIG. 2, the system 100 further includes a floor flap 128 that is located or formed in the first floor 102. The floor flap 128 is attached to the first floor 102 and is used to expose or cover an opening 127 in the first floor 102. The opening 127 is sized such that the lifting cylinder 120 and the object 112 can be extended though the opening 127. The floor flap 128 is sized to cover the opening 127 in the first floor 128. In one example, the floor flap 128 includes one piece of material attached to one side of the opening 127. In another example, the floor flap 128 includes two pieces of material, each piece attached at opposite sides of the opening 127. The floor flap 128, when open, is generally perpendicular, or greater than perpendicular, relative to the first floor 128 to allow the lifting cylinder 120 to extend through the opening 127 without contacting the floor flap 128. Although not shown, the floor flap 128 is actuated by an electronically-controllable actuator, such as a pneumatic or hydraulic cylinder or motor.

The floor flap 128 opens and closes in synchronization with the extension and retraction of the lifting cylinder 120. The floor flap 128 opens as the lifting cylinder 120 is extended toward the first floor 102 and will remain open while the lifting cylinder 120 is in the extended position 126. The floor flap 128 closes as the lifting cylinder 120 is extended below the first floor 102 and remains closed while the lifting cylinder 120 is in the retracted position 124. If the floor flap 128 is of sufficient strength it can also be used to prevent a moving object, such the operator 128 or a cart from falling into the opening 127.

Figure 3:
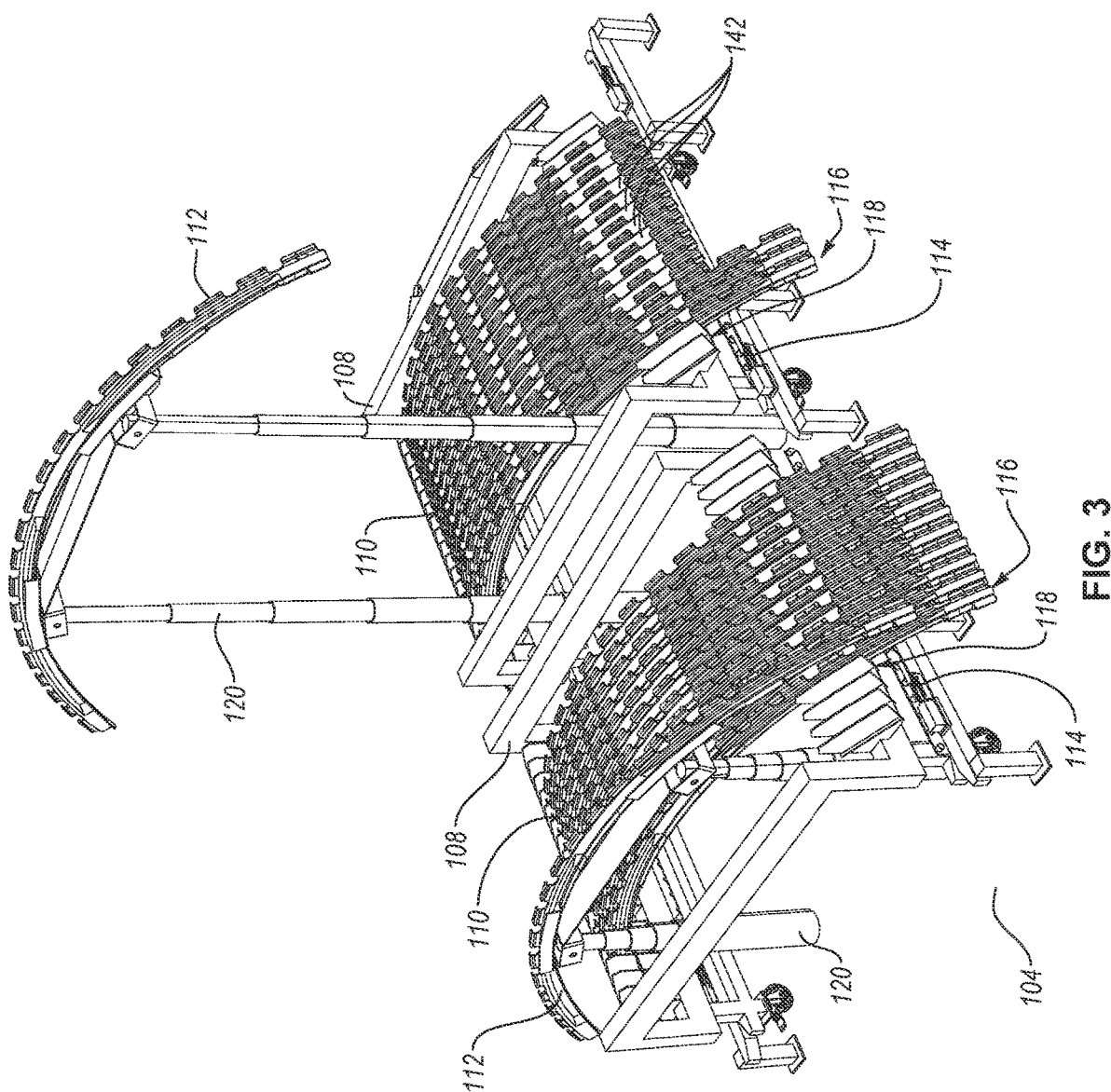
FIG. 3 is a schematic perspective view of an object rack with a lifting cylinder in an extended position, according to one or more examples of the present disclosure.
Figure 4:
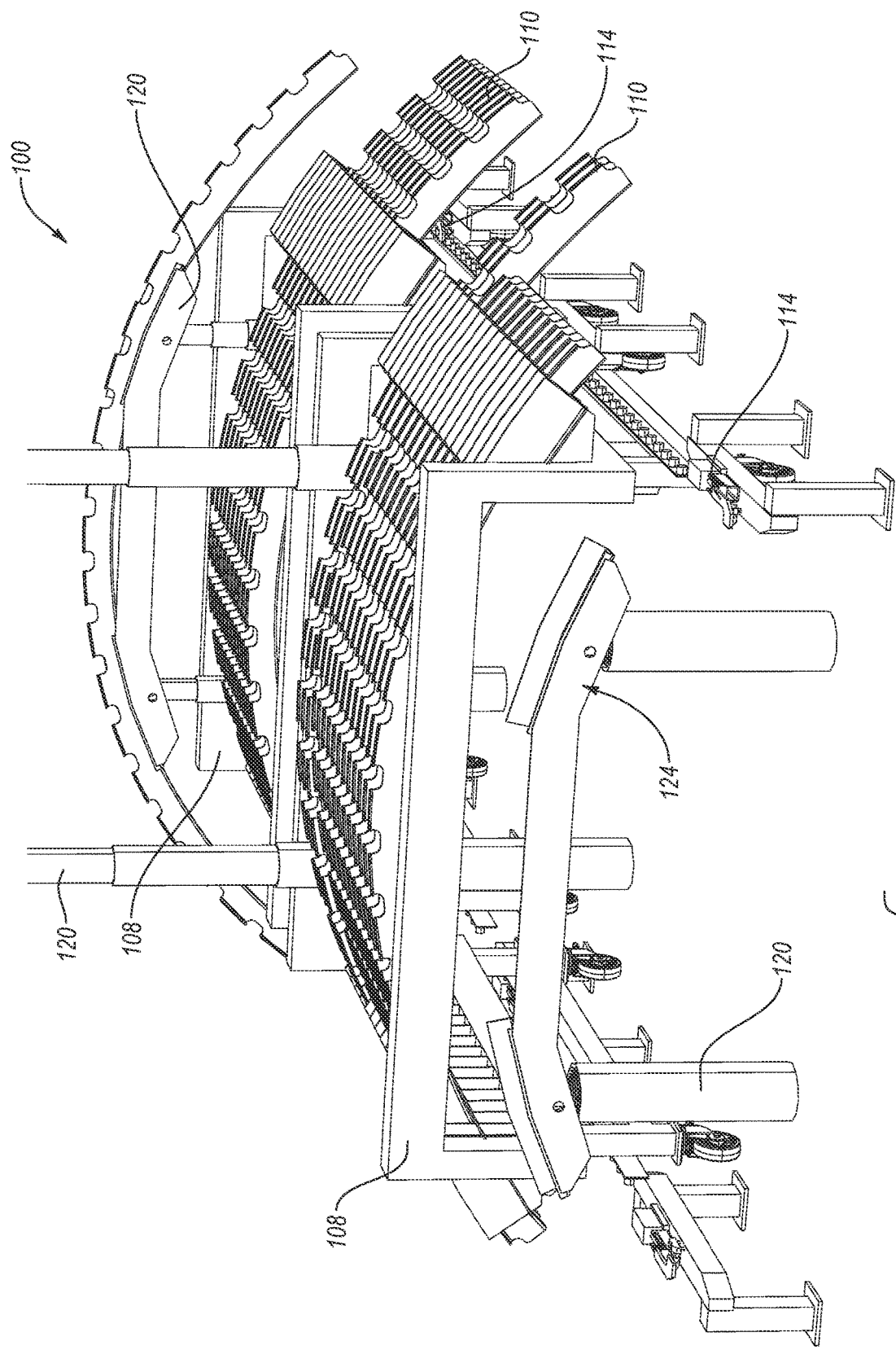
FIG. 4 is a schematic perspective view of an object rack, according to one or more examples of the present disclosure.

As shown in FIGS. 3 and 4, the lifting cylinder 120 moves vertically in line with the lifting position 118 on the object rack 108. At its lowest vertical position, the lifting cylinder 120 is in the retracted position 124 below the lifting position 118 on the object rack 108. At its highest vertical position, the lifting cylinder 120 is in the extended position 126 (see, e.g., FIG. 2) above the first floor 102. The lifting cylinder 120 extends and retracts between the retracted position 124 and the extended position 126 to lift an abject from the object rack 108 to an intermediate location adjacent to the assembling body 106. Specifically, the lifting cylinder 120 extends from the retracted position 124 and lifts one object 112 in the lifting position 118 from the object rack 108, and continues to extend to the extended position 126 above the first floor 102. In this position, an operator 138 (see, e.g., FIG. 2) on the first floor 102 may remove the one object 112 from the lifting cylinder 120 for installation to the assembling body 106.

As shown in FIG. 3, in one example, the object rack 108 includes a plurality of notches 142. The notches 142 are sized to matingly engage corresponding features of a corresponding object 112 of the plurality of objects 110. Accordingly, each notch 142 supports a corresponding object 112 of the plurality of objects 110, and the corresponding object 112 remains engaged with the corresponding notch 142 until the corresponding object 112 is lifted from the object rack 108 by the lifting cylinder 120.

The system 100 additionally includes an object advance apparatus 114 that is coupleable with the object rack 108 to advance the object rack 108 relative to the lifting cylinders 120. Accordingly, the object advance apparatus 114 is configured to advance the object rack 108 along the second surface 104, and relative to the lifting cylinders 120, such that the objects 112 of the plurality of objects 110 advance one-by-one from an advancing position 116, horizontally away from, any one of the lifting cylinders 120 to a lifting position 118, vertically above one of the lifting cylinders 120. The object advance apparatus 114 advances the object rack 108 in a cyclical pattern, moving one object at a time from the advancing position 116 to the lifting position 118.

In some examples, multiple object racks 108 are used to lift objects, with each object rack 108 supporting a plurality of objects 110. Multiple object racks 108 may be used to increase the rate at which objects are lifted by the lifting cylinders 120. Additionally or alternatively, a specific lifting cylinder 120 can be utilized to lift an object to a specific location adjacent to the assembling body 106.

At least one lifting cylinder 120 is associated with each object rack 108 and positioned in line with the lifting position 118 on each object rack 108. However, at shown in FIG. 3, multiple lifting cylinders 120 are associated with each object rack 108 such that multiple objects from the same rack can be lifted synchronously from the same object rack 108 by multiple lifting cylinders 120. Each lifting cylinder 120 can be configured to automatically extend from the retracted position 124 to the extended position 126 and retract from the extended position 126 to the retracted position 124 at a specific rate. In one example, each lifting cylinder 120 is configured to extend and retract simultaneously with the other lifting cylinders 120. In another example, each lifting cylinder 120 is configured to extend and retract consecutively with the other lifting cylinders 120. In yet another example, a user device 136 can be selectively operable by the operator 138 to extend and retract at least one lifting cylinder 120.

Figure 5:
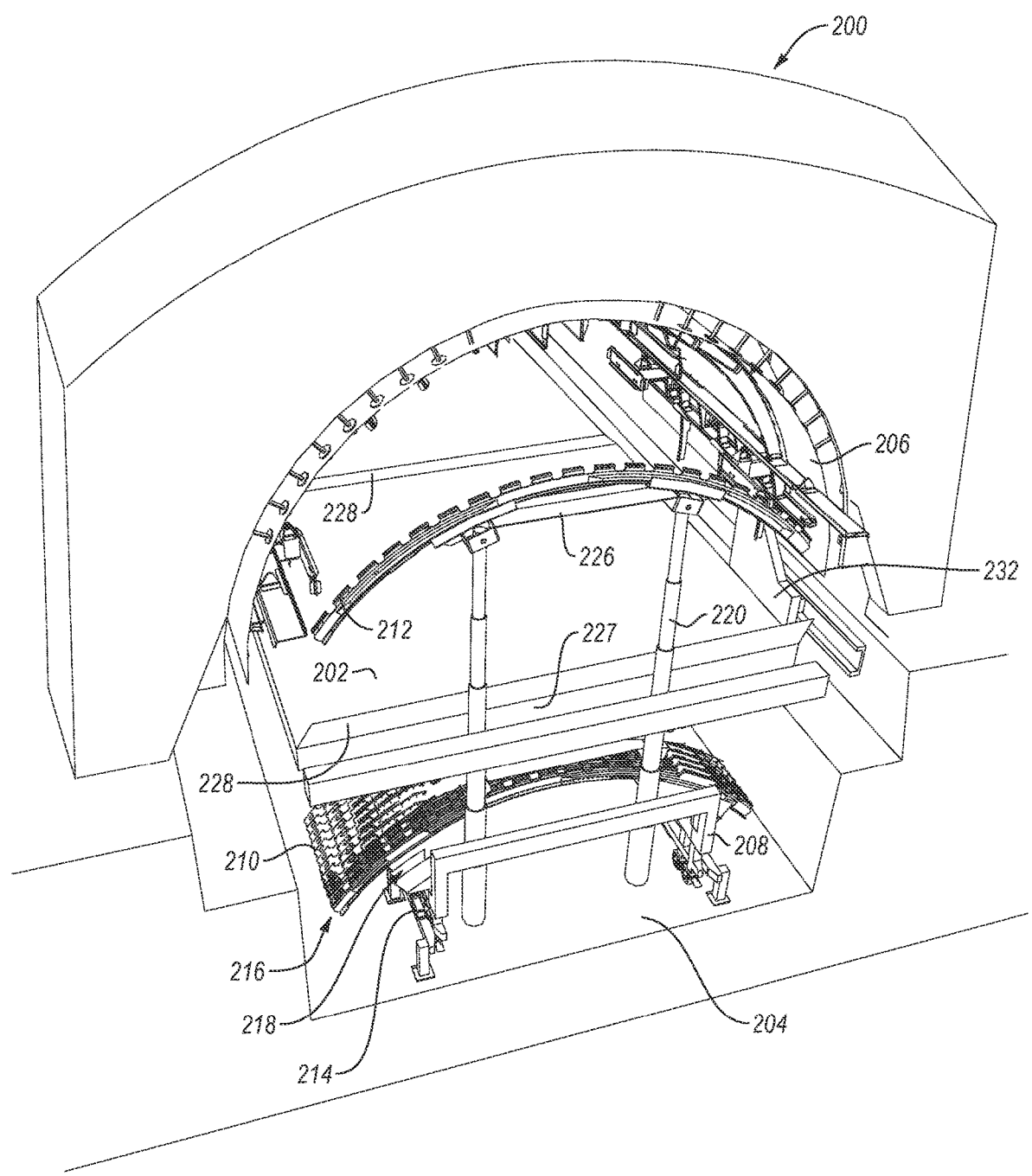
FIG. 5 is a schematic perspective view of a system for lifting an object to an aircraft fuselage, according to one or more examples of the present disclosure.
Figure 6:
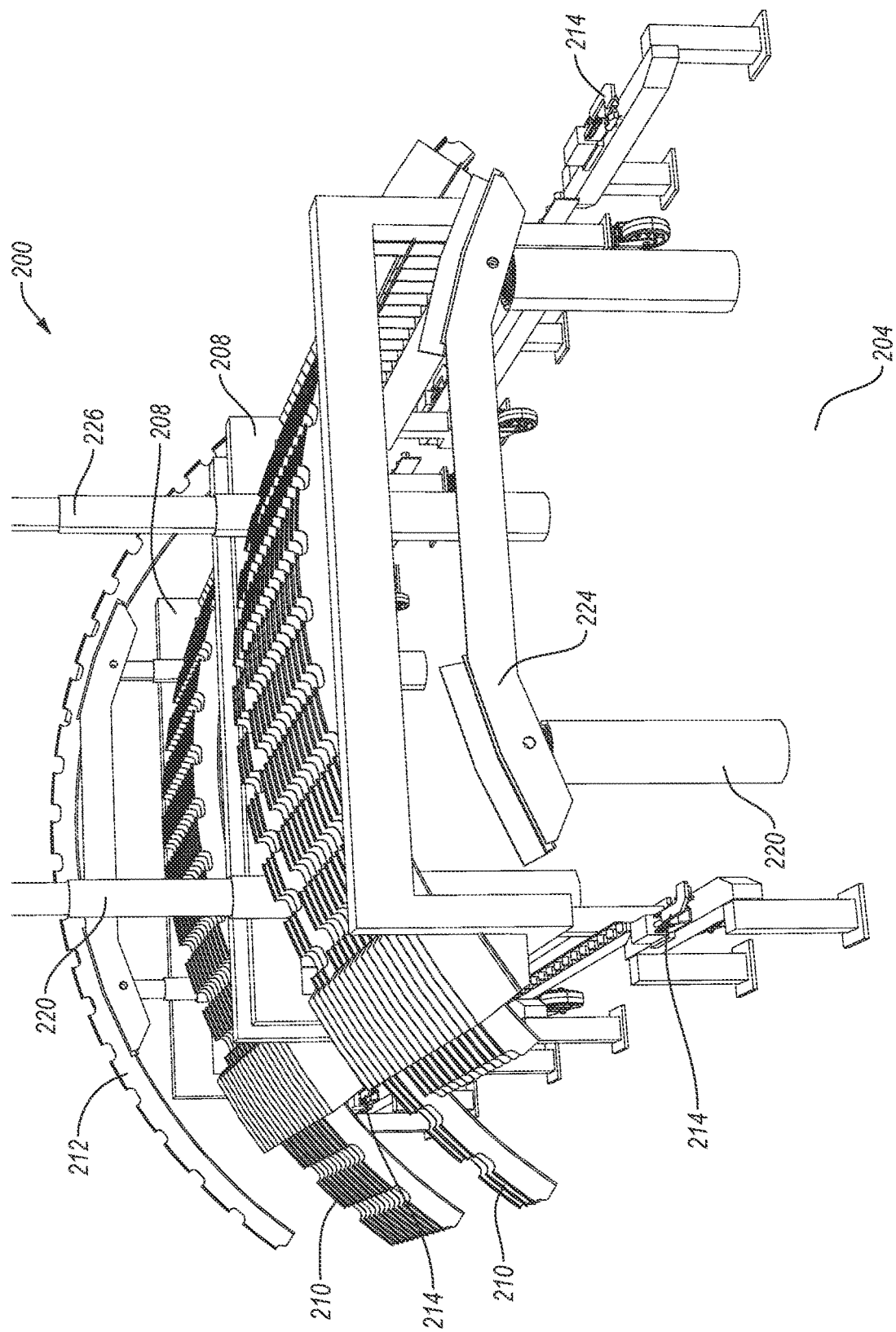
FIG. 6 is a schematic perspective view of an object rack, according to one or more examples of the present disclosure.

Referring to FIGS. 5-6, a system 200 similar to the system 100 can be used to bring aircraft fuselage frames 210 to an aircraft fuselage 206. The system 200 includes a first floor 202 that is directly upon a second floor 204. The fuselage 206 is in the process of being assembled and is secured to the first floor 202. The fuselage 206 is indirectly secured to the first floor 202 by being secured to a conveyor system 232, the conveyor system 232 moveably secured to the first floor 202. The conveyor system 232 is used to move the fuselage 206 through an assembly line while the fuselage 206 is assembled.

The system 200 includes a plurality of frame racks 208 that are supported by the second floor 204. Each frame rack 208 supports a plurality of frames 210. In one example, the plurality of frames 210 are all identical frames. In other examples, the plurality of frames 210 may vary in size, shape, weight, etc. The system 100 includes a plurality of lifting cylinders 220 that are also supported by the second floor 204, with one lifting cylinder 220 associated with each frame rack 208. The lifting cylinders 220 are separate from the frame rack 208 and the frame rack 208 is configured to move along the second floor 204 relative to the lifting cylinder 220. The lifting cylinders 220 are positioned in line with lifting positions 218 on the frame rack 208. Accordingly, the lifting cylinders 220 are configured to extend and retract vertically in line with the lifting positions 218. As shown in FIG. 5, one frame 212 is being lifted from the frame rack 208 by one lifting cylinder 220 of the plurality of lifting cylinders 220. Such lifting cylinder 220 is in an extended position 226.

The system 200 further includes multiple floor flaps 228 that are located in the first floor 202. Each floor flap 228 is attached to the first floor 202 and used to expose or cover an opening 227 in the first floor 202. Each floor flap 228 corresponds with a lifting cylinder 220 that is directly beneath the floor flap 228 on the second floor 204. Each floor flap 228 opens and closes in synchronization with the extension and retraction of the corresponding lifting cylinder 220. The floor flap 228 opens as the corresponding lifting cylinder 220 is extended toward the first floor 202 and remains open while the corresponding lifting cylinder 220 is in the extended position 226. The floor flap 228 closes as the corresponding lifting cylinder 220 is extended below the first floor 202 and remains closed while the corresponding lifting cylinder 220 is in the retracted position 224.

The system 200 also includes a frame advance apparatus 214 that is coupled with each frame rack 208. Each frame advance apparatus 214 is configured to advance the frame rack 208, one frame 212 at a time, from an advancing position 216 to the lifting position 218. The frame advance apparatus 214 advances the frame rack 208 in a cyclical pattern, moving one frame from the advancing position 216 to the lifting position 218 at a time.

In one implementation, the system 200 provides an efficient means of lifting frames into the fuselage 206 on a pulsed assembly line, and bringing the frames to the point of assembly. The lifting and delivery of frames is coordinated with fuselage movement along the pulsed assembly line.

Figure 7:
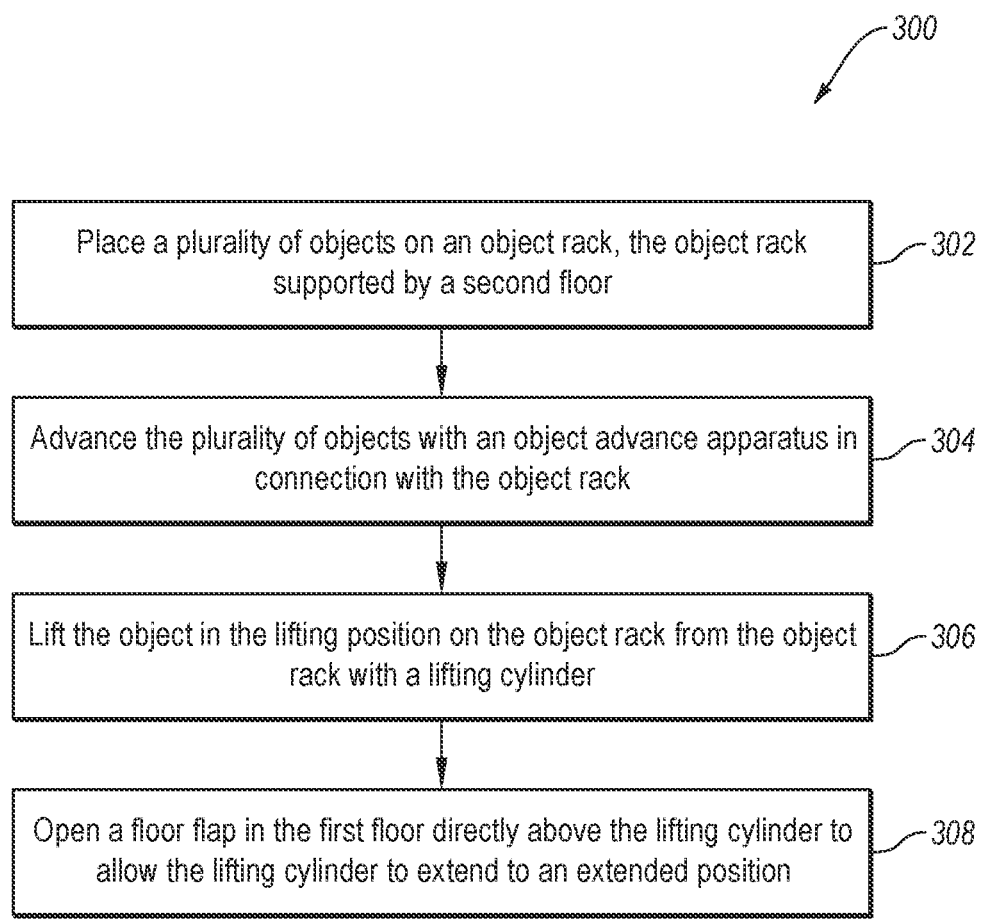
FIG. 7 is a schematic flow diagram of a method of lifting an object, according to one or more examples of the present disclosure.

Referring to FIG. 7, according to one example, a method 300 of lifting an object includes (block 302) placing a plurality of objects 110 on an object rack 108. The object rack 108 is supported by a second floor 104, the second floor 104 being directly below a first floor 102. The method 300 also includes (block 304) advancing the plurality of objects 110 with an object advance apparatus 114 in connection with the object racks. The one object 112 of the plurality of objects 110 advances from an advancing position 116 to a lifting position 118. The method further includes (block 306) lifting the one object 112 in the lifting position 120 from the object rack 108 with a lifting cylinder 120. The lifting cylinder 120 is on the second floor 104 and positioned in line with the lifting position 118 on the object rack 108. The lifting cylinder 120 extends from a retracted position 124 below the lifting position 118 on the object rack 108 to an extended position 126 above the first floor 102. The method 300 additionally includes (block 308) opening a floor flap 128 in the first floor 102 directly above the lifting cylinder 120. The floor flap 128 is synchronized with the lifting cylinder 120, such that the floor flap 128 opens as the lifting cylinder 120 is extended toward the first floor 102 and remains open while the lifting cylinder 120 in in the extended position 126.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A system for lifting an object, the system comprising:
    a first floor and a second floor, the first floor being directly above the second floor and securing an assembling body and the second floor;
    an object rack supported on the second floor, wherein the object rack is configured to support a plurality of objects, the plurality of objects configured to be attached to the assembling body;
    an object advance apparatus coupled with the object rack, the object advance apparatus configured to advance one object from the plurality of objects from an advancing position to a lifting position;
    a lifting cylinder supported by the second floor and positioned in line with the lifting position on the object rack, the lifting cylinder configured to extend from a retracted position below the lifting position on the object rack to an extended position above the first floor, such that as the lifting cylinder is extended from the retracted position the one object in the lifting position is removed from the object rack and lifted adjacent to the assembling body; and
    a floor flap in the first floor directly above the lifting cylinder, the floor flap configured to open and close in synchronization with the extension and retraction of the lifting cylinder such that the floor flap is opened as the lifting cylinder is extended toward the first floor and remains opened while the lifting cylinder is in the extended position and is closed when the lifting cylinder is retracted below the first floor toward the retracted position and remains closed while the lifting cylinder is in the retracted position.

2. The system of claim 1, wherein the assembling body is an aircraft fuselage.

3. The system of claim 2, wherein the plurality of objects is a plurality of frame sections to be attached to the aircraft fuselage.

4. The system of claim 1, further comprising:
    a plurality of object racks, each object rack of the plurality of object racks is configured to support a plurality of objects;
    an object advance apparatus coupled with each object rack of the plurality of object racks, each one of the object advance apparatus is configured to advance one object from the plurality of objects of a corresponding one of the plurality of object racks from an advancing position to a lifting position;
a plurality of lifting cylinders on the second floor, wherein a corresponding one of the plurality of lifting cylinders is positioned in line with the lifting position on each object rack of the plurality of object racks, each one of the plurality of lifting cylinders is configured to extend from the retracted position below the lifting position on the corresponding object rack to the extended position above the first floor, such that as the lifting cylinder is extended from the retracted position the one object in the lifting position is removed from the corresponding object rack and lifted adjacent to the assembling body secured to the first floor; and
a plurality of floor flaps in the first floor each directly above a corresponding one of the lifting cylinders of the plurality of lifting cylinders, each floor flap configured to open and close in synchronization with the extension and retraction of the corresponding lifting cylinder, such that the floor flap is opened as the corresponding lifting cylinder is extended toward the first floor and remains opened while the corresponding lifting cylinder is in the extended position and is closed when the corresponding lifting cylinder is retracted below the first floor toward the retracted position and remains closed while the corresponding lifting cylinder is in the retracted position.

5. The system of claim 4, wherein:
the plurality of lifting cylinders is configured to automatically extend from the retracted position to the extended position and retract from the extended position to the retracted position at a specific rate;
the plurality of cylinders is configured to extend and retract simultaneously; and
the object advance apparatus coupled with each object rack is configured to advance one object from the plurality of objects from the advancing position to the lifting position when the lifting cylinder is in the retracted position.

6. The system of claim 4, wherein:
the plurality of lifting cylinders is configured to automatically extend from the retracted position to the extended position and retract from the extended position at a specific rate;
each lifting cylinder of the plurality of lifting cylinders is configured to extend and retract consecutively with the other lifting cylinders of the plurality of lifting cylinders; and
the object advance apparatus connected to each object rack is configured to advance one object from the plurality of objects from the advancing position to the lifting position when the lifting cylinder is in the retracted position.

7. The system of claim 4, wherein:
each lifting cylinder of the plurality of lifting cylinders is in electrical communication with a user device; and
the user device is selectively operable by an operator to extend from the retracted position to the extended position and retract from the extended position to the retracted position at least one lifting cylinder of the plurality.

8. The system of claim 1, further comprising a conveyor system, wherein:
the assembling body is secured to the conveyor system on the first floor; and
the assembling body is moved along the conveyor system at a specified pulse rate.

9. The system of claim 1, further comprising a user device in electrical communication with the lifting cylinder, wherein the user device is selectively operable by an operator to extend and retract the lifting cylinder.

10. The system of claim 1, wherein:
the object rack has a plurality of notches; and
each object of the plurality of objects is supported on the object rack in engagement with a corresponding notch of the plurality of notches.

11. A system for lifting an object, the system comprising:
a first floor and a second floor, the first floor being directly above the second floor and securing an aircraft fuselage and the second floor supporting a plurality of frame racks, wherein each frame rack of the plurality is configured to support a plurality of frames, the plurality of frames configured to be attached to the aircraft fuselage;
a frame advance apparatus in connection with each frame rack of the plurality, the frame advance apparatus configured to advance one frame from the plurality of frames from an advancing position on each frame rack to a lifting position on each frame rack;
a plurality of lifting cylinders supported by the second floor, one lifting cylinder of the plurality positioned in line with the lifting position on a corresponding frame rack, each lifting cylinder is configured to extend from a retracted position below the lifting position on the corresponding frame rack to an extended position above the first floor, such that as each lifting cylinder is extended from the retracted position the one frame in the lifting position is removed from the corresponding frame rack and lifted adjacent to the aircraft fuselage; and
a plurality of floor flaps, each one of the plurality of floor flaps in the first floor is directly above a corresponding one of the plurality of lifting cylinders, the floor flaps are configured to open and close in synchronization with the extension and retraction of the corresponding lifting cylinder, such that the floor flaps are opened as the corresponding lifting cylinder is extended toward the first floor and remains opened while the lifting cylinder is in the extended position and are closed when the corresponding lifting cylinder is retracted below the first floor toward the retracted position and remains closed while in the corresponding lifting cylinder is in the retracted position.

12. A method of lifting an object, the method comprising:
placing a plurality of objects on an object rack, the object rack supported by a second floor, the second floor being directly below a first floor, wherein the first floor secures an assembling body and the plurality of objects are configured to be attached to the assembling body;
advancing the plurality of objects with an object advance apparatus coupled with the object rack, wherein one object of the plurality of objects advances from an advancing position to a lifting position;
lifting the one object in the lifting position from the object rack with a lifting cylinder, the lifting cylinder on the second floor and positioned in line with the lifting position on the object rack, wherein the lifting cylinder extends from a retracted position below the lifting position on the object rack to an extended position above the first floor so that the one object is lifted adjacent to the assembling body; and
opening a floor flap in the first floor directly above the lifting cylinder, wherein the floor flap is in synchronization with the lifting cylinder, such that the floor flap opens as the lifting cylinder is extended toward the first floor and remains open while the lifting cylinder is in the extended position.

13. The method of claim 12, further comprising:
removing the one object from the lifting cylinder;
retracting the lifting cylinder from the extended position to the retracted position; and
closing the floor flap as the lifting cylinder is retracted below the first floor towards the retracted position and remaining closed while the lifting cylinder is in the retracted position.

14. The method of claim 13, further comprising:
advancing remaining objects of the plurality of objects, wherein one object of the plurality of objects advances from the advancing position on the object rack to the lifting position on the object rack;
lifting the one object in the lifting position from the object rack with the lifting cylinder, wherein the lifting cylinder extends from the retracted position below the lifting position on the object rack to the extended position above the first floor; and
opening the floor flap in the first floor directly above the lifting cylinder, wherein the floor flap is in synchronization with the lifting cylinder, such that the floor flap opens as the lifting cylinder is extended toward the first floor.

15. The method of claim 12, further comprising:
removing the one object from the lifting cylinder by an operator on the first floor; and
installing the one object on the assembling body by the operator, the assembling body is secured to the first floor.

16. The method of claim 15, wherein:
the one object comprises a frame device;
the assembly body comprises an aircraft fuselage; and
installing the one object on the assembly body comprises installing the frame device to the aircraft fuselage.

17. The method of claim 12, wherein:
placing a plurality of objects on an object rack comprises placing a plurality of objects on a plurality of object racks, such that each object rack of the plurality supports a plurality of objects;
advancing the plurality of objects with the object advance apparatus comprises advancing the plurality of objects on each object rack with an object advance apparatus coupled with each object rack;
lifting the one object in the lifting position from the object rack with a lifting cylinder comprises lifting the one object in the lifting position from at least one object rack of the plurality of object racks; and
opening a floor flap in the first floor comprises opening a floor flap of a plurality of floor flaps in the first floor that is directly over the lifting cylinder that is extending to the extended position.

18. The method of claim 17, wherein lifting the one object in the lifting position comprises lifting the one object in each lifting cylinder of the plurality of lifting cylinders simultaneously.

19. The method of claim 17, wherein lifting the one object in the lifting position comprises lifting the one object in each lifting cylinder of the plurality of lifting cylinders consecutively.

20. The method of claim 17, further comprising operating a user device in electrical communication with the plurality of lifting cylinders to lift at least one lifting cylinder of the plurality of lifting cylinders, wherein the user device is selectively operable by an operator to extend and retract the lifting cylinders.

* * * * *